United States Patent [19]
Chu et al.

[11] Patent Number: 5,635,037
[45] Date of Patent: Jun. 3, 1997

[54] METHOD OF TEXTURE BY IN-SITU MASKING AND ETCHING FOR THIN FILM MAGNETIC RECORDING MEDIUM

[75] Inventors: Jau-Jier Chu, Taipei; Chung-Yu Ting, Hsinchu; Oliver J. Horng, Hsinchu Hsien; Jye-Yen Cheng, Yun-Lin Hsien; Charles C. Lin, Hsinchu; Mei-Rurng Tseng, Taipei, all of Taiwan

[73] Assignee: Industrial Technology Research Institute, Hsinchu, Taiwan

[21] Appl. No.: 101,456

[22] Filed: Aug. 2, 1993

[51] Int. Cl.⁶ .................................................. C23C 14/00
[52] U.S. Cl. ................ 204/192.35; 204/192.2; 204/192.32; 204/192.34; 204/192.37; 427/127; 427/128; 427/130; 427/131; 427/132; 216/27; 216/42; 216/67
[58] Field of Search ............................ 204/192.1, 192.2, 204/192.32, 192.34, 192.37, 192.35; 427/127, 128, 129, 130, 131, 132; 216/27, 42, 67

[56] References Cited

FOREIGN PATENT DOCUMENTS

| 0130063 | 1/1985 | European Pat. Off. .......... G11B 5/70 |
| 0422640 | 4/1991 | European Pat. Off. .......... G11B 5/012 |

*Primary Examiner*—Leszek Kiliman
*Attorney, Agent, or Firm*—W. Wayne Liauh

[57] ABSTRACT

A magnetic recording medium controllably textured by performing sputter etching or reactive ion etching either on the surface of a smooth substrate, which can be nickel-phosphorous/aluminum-magnesium (Al—Mg) substrate, or on the surface of a protective layer, such as a carbon overcoat. Both types of etching processes described above are carried out in a sputtering apparatus and have an etching mask of discrete hemi-spherical structures formed by the agglomeration of a low melting point metal or alloy such as indium or Pb—Sn, which has been deposited on a non-wetting surface such as the oxidized surface of NiP layer or the protective carbon overcoat prior to etching. The morphology of the textured surface can be controlled by adjusting the average thickness of the deposited masking materials, the gas composition, as well as the base pressure during etching. An optimum texture created by either sputter etching or reactive ion etching on a magnetic recording medium provides better wear resistance and a lower flying height of a magnetic head as compared to conventional mechanical texturing techniques. In addition, the manufacturing processes of the magnetic recording medium thus defined including the deposition of underlayer, magnetic layer and protective overcoat and the creation of surface texture can be successively performed within a single vacuum system without breaking vacuum; the present invention thus possesses the advantages of process automation, improving quality, and lowering manufacturing cost.

15 Claims, 4 Drawing Sheets

METHOD OF TEXTURE BY IN-SITU MASKING AND ETCHING FOR THIN FILM MAGNETIC RECORDING MEDIUM

FIELD OF THE INVENTION

This invention relates to a high-density magnetic recording medium and the method for manufacturing the same. More particularly, this invention relates to a method for controllably imparting a textured surface on a high-density magnetic recording medium to thereby reduce stiction and/ or friction between a magnetic head and the recording medium, allow a lower flying height of the magnetic head, and thus increase the recording density of the recording medium.

BACKGROUND OF PRESENT INVENTION

A computer disk, which is the most commonly used device to permanently store and retrieve data, comprises two principal components: a magnetic head (i.e., a transducing head) and a magnetic recording disk. The magnetic head writes data onto the magnetic recording disk through the change of the magnetic field in the magnetic head, which is caused by the change of the electric current that flows therethrough in accordance with the output signal from the central processing unit. On the other hand, the magnetic head also reads data from the magnetic recording disk, which induces a voltage in the magnetic head in accordance with the data that have been magnetically stored thereon. The voltage so induced is subsequently amplified and converted back into its original digital data form before it is transmitted to the central processing unit.

A magnetic recording disk typically comprises a plurality of tracks on which information is recorded or read out by sliding or flying a magnetic head over the surface of the magnetic disk along a circumferential path. With the proliferation and increased complexity of personal computers in handling a wide variety of tasks from desktop publishing to CAD, there is a great demand for magnetic disks with increased recording density.

The recording density of a magnetic recording medium is inversely proportional to the flying height of the magnetic head, with which the information is being recorded and read out. Consequently, in designing computer disks, the flying height of the magnetic head should be reduced as much as possible, in order to increase the recording density thereof. As such, the surface of the disk substrate should be extremely smooth to permit a lower flying height. However, the extreme smoothness of the disk also results in a high contact area between the disk and the magnetic head which, in turn, leads to a high degree of stiction and/or friction during the start up and the stopping of the disk. The high degree of stiction or friction can cause damage to the disk, the recording head and its accompanying assembly, as well as the disk drive motors. In order to alleviate these problems, a high wear resistance overcoat, such as amorphous carbon film, has been used which is deposited upon the magnetic film to protect the recording medium from incurring damage. In addition, various types of organic lubricant have also been applied onto the outermost layer to reduce the friction between the recording medium and the magnetic head. However, even an extremely smooth disk with a well designed lubricant coating can still exhibit unacceptably high levels of stiction and friction. To facilitate the retention of lubricant and thus lower the stiction and/or friction, a controlled surface topology, or the so-called "texture" is often required.

Texture also provides another purpose. Conventionally, in order to reduce undesirable stiction and friction, computer disk manufacturers often roughen the surface of the disk substrate by mechanical abrasive technique, known as texturing, in order that the magnetic head, when it slides across the landing area, contacts with a rough surface on the disk rather than a flat surface. This reduces the contact area between the magnetic head and disk surface, and thus result in a reduction of the stiction and friction therebetween. In the conventional mechanical texturing process, numerous small grooves or valleys are abraded on the disk surface.

The conventional disk texturing processes mentioned above use rotating pads or tapes with a circular motion to engage the rotating surface of the disk with a slurry that contains abrasives. The conventional mechanical texturing technique has several disadvantages in that, for example, it is usually associated with the formation of weldments and asperities along the texture lines. These weldments and asperities can result in an increase in the required flying height as well as severe wears on the magnetic layer during the operation of the disk. Typically, a $2\mu$ flying height is perhaps the lowest height that can be achieved using the conventionally texturing technique. In the case of using rotating pads for disk texturing, it further has other disadvantages, including pad break-ins, short pad life, and difficulties in effectuating process automation.

Eur. Pat. App. No. 0 421 120 A2 discloses a magnetic storage medium prepared by depositing evaporated gallium films over a non-wetting silicon dioxide substrate at a temperature above the melting point of gallium, which forms many spherical structures or features. Thereafter, a Co—Pt—Cr alloy magnetic film layer is deposited over the gallium layer resulting in a reaction of gallium with the magnetic film. This method has several technological drawbacks and has not been commercialized utilized.

It is desirable to have a non-mechanical abrasive texturing process which not only provides improvements in the reduction of the flying height of the transducing head as well as the tribological characteristics of the magnetic recording disk and the controllability of the texture pattern, but also possesses the advantages in allowing process automation.

SUMMARY OF THE INVENTION

Having discussed the shortcomings of the prior art disk texturing techniques, the primary object of the present invention is, therefore, to provide an improved method for texturing magnetic disks which will allow a well regulated and uniform texture across the entire disk surface, or only a portion thereof. More particularly, the primary object of the present invention is to provide a non-abrasive texturing method which can be implemented in a preciously controlled manner with regard to both the quality and quantity of the surface texture. The magnetic recording disks prepared using the method disclosed in the present invention are provided with an optimized texture morphology, which possesses excellent wear characteristics and allows low flying height of the magnetic head. The method disclosed in the present invention is also well suited for automated manufacturing process.

In brief, the primary object of this invention is to provide a novel approach for texturing the surface of a magnetic disk by performing sputter or reactive ion etching on the substrate surface (which could be a Ni—P layer plated on Al—Mg substrate) or performing sputter or reactive ion etching on the surface of a top overcoat layer (which could be a carbon overcoat) deposited upon a magnetic film. Both types of etching processes described above are carried out by the use of an etching mask comprising a plurality of discretely dispersed hemi-spherical islands of a masking composition, which could be indium (in) or other low melting point metals, such as Ga, Sn, Bi, Pb, or alloys thereof, which are deposited on a non-wetting surface of the substrate (e.g., oxidized Ni—P substrate) or overcoat (e.g., a carbon overcoat), prior to the proceeding of the sputter etching or reactive ion etching step.

The oxidized Ni—P layer can be accomplished by furnace oxidation, or by RF and DC plasma oxidation in a vacuum chamber.

One of the advantages of the present invention is that both the sputter etching and reactive ion etching involve well-known technology. Examples of well-known textbooks describing these techniques can be found in, for example, "Glow Discharge Processes: Sputtering and Plasma Etching," by Brian Chapman; "Handbook of Thin-Film Deposition Processes and Techniques," edited by Klaus K. Schuegraf, Noyes Publication, Park, Ridge, New Jersey; and "Thin Film Processes," edited by John L. Vossen and Werner Kern, Academic Press.

In a preferred embodiment of the present invention, the substrate is heated to a temperature close to the melting point of the masking composition (which could be indium or other low melting point metals or alloys as described above) during or after the sputter deposition of such a masking composition, so that agglomeration of the masking composition would take place to form discrete hemi-spherical islands, which will be used subsequently as an etching mask. After the sputter etching or reactive ion etching step, the discrete islands of indium or other mask material are completely etched away; whereas, the hemi-spherical feature of the mask is reproduced on the Ni—P surface or carbon overcoat surface which forms a texture pattern on the magnetic disk.

Depending on the surface structure of the magnetic disks, at least two preferred approaches can be contrived for carrying out the objects of the present invention. In the first approach of the present invention, the texture of a magnetic recording disk is created on the surface of a substrate, a chromium (Cr) film is subsequently deposited on the textured Ni—P surface as a underlayer, a magnetic layer of cobalt-based alloy is deposited overlaying the chromium layer, and then a protective overcoat of amorphous carbon film is formed on the magnetic layer. Finally, a lubricant layer is applied onto the protection layer.

The protective overcoat can also be made of oxides or nitrides.

In the second approach of the present invention, an underlayer of chromium film is deposited on a specially polished surface of Ni—P layer coated on Al—Mg substrate, and the corresponding magnetic layer and protective overcoat are successively deposited on chromium film. The texture of the magnetic disk is then created on the surface of the protective overcoat by sputter etching or reactive ion etching as mentioned above. At last, a lubricant layer is applied onto the textured overcoat.

The method disclosed in the present invention, including the two approaches described above, can be easily applied to the entire disk or only a portion or portions thereof. For example, the method disclosed in the present invention can be applied only to the inner diameter (I.D.) landing area, to thereby achieve a "band texture" on the disk surface.

BRIEF DESCRIPTION OF THE DRAWINGS

The present invention can be more fully understood from the subsequent detailed description of the preferred embodiment and examples, with references made to the accompanying figures, wherein.

DETAILED DESCRIPTION OF THE PREFERRED EMBODIMENTS

The present invention will now be described more specifically with reference to the following preferred embodiments. It is to be noted that the following descriptions of examples including preferred embodiments of this invention are presented herein for purpose of illustration and description; it is not intended to be exhaustive or to limit the invention to the precise form disclosed.

Figure 1:
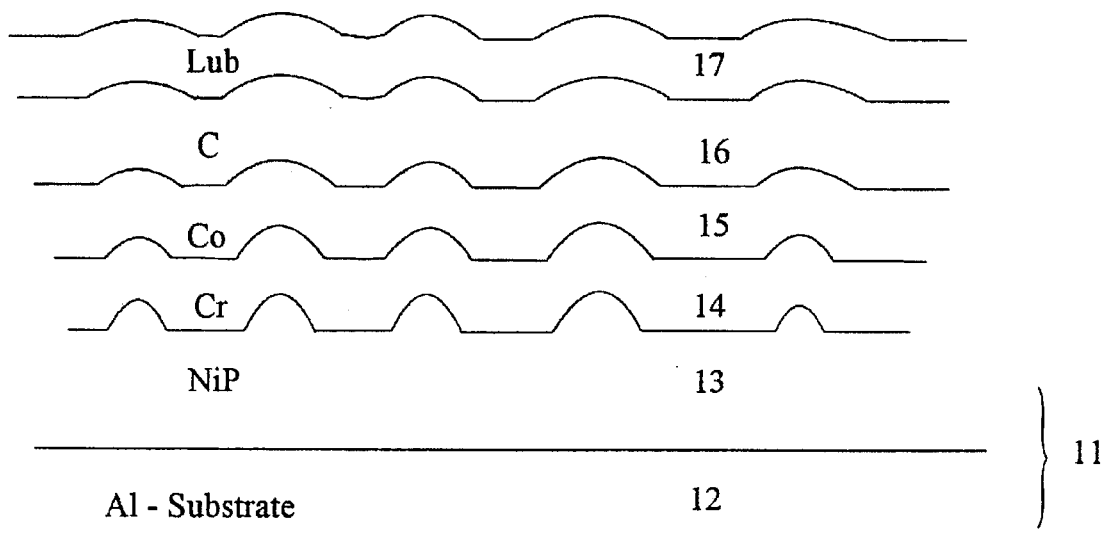
FIG. 1 shows an enlarged partial sectional view of a magnetic recording medium prepared according to the first preferred embodiment of the present invention.

First Preferred Embodiment:

Referring now to FIG.1, it is shown a magnetic recording medium manufactured according to the first preferred embodiment of this invention which comprises a substrate member 11 (12+13), an underlayer 14, a magnetic recording layer 15, a carbon-based protective overcoat 16, and an outermost lubricant layer 17. In FIG. 1, the substrate member 11 comprises an aluminum-magnesium substrate ("Al—Mg substrate" or "Al—Substrate" as referred to in FIG. 1) 12 and a plated nickel-phosphorous (Ni—P) layer 13, on which surface texture having a hemi-spherical feature is created. The method disclosed in the first preferred embodiment comprises the following steps:

(a) Polishing substrate:

In the preparation of the illustrated magnetic recording medium in accordance with the first preferred embodiment of the present invention, substrate member 11 was formed first by polishing, grinding or otherwise machining an Al—Mg substrate 12. Next, a Ni—P alloy layer 13 was plated onto the surface of the Al—Mg substrate by the use of an electroless plating technique. Following plating, the Ni—P alloy layer 13 was polished to a surface roughness (Ra) of about 20 angstroms.

Figure 2:
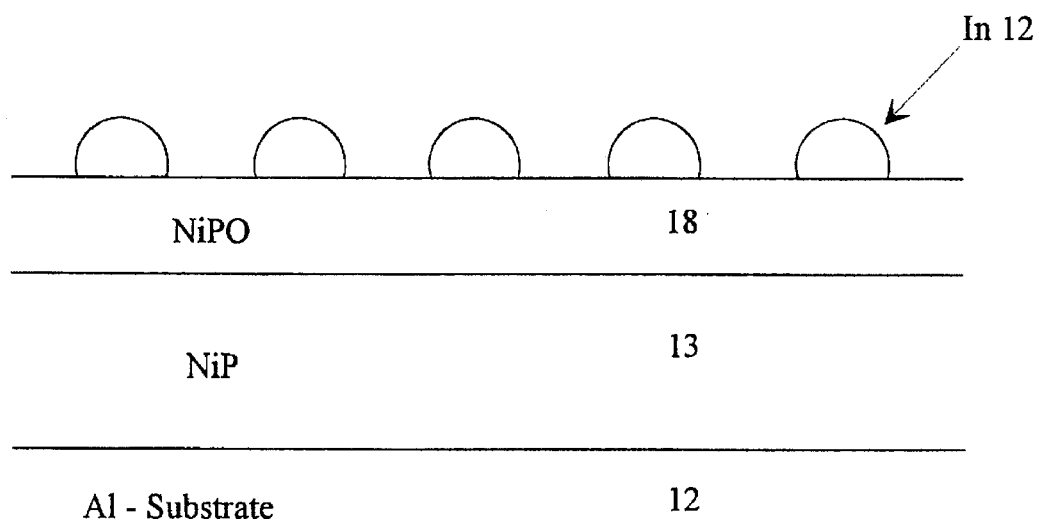
FIG. 2 is a cross-sectional representation of discrete hemispherical islands of indium or other low melting point materials deposited on the surface of a heated and oxidized NiP substrate in accordance with the first preferred embodiment of the present invention; an agglomeration of the low melting point material forms the discrete islands on the top of oxidized NiP (Ni—P—O).

(b) Surface Treatment of the Substrate:

After polishing the surface of the Ni—P layer 13, the substrate 11 was introduced into an oxygen ambient furnace or in an oxygen plasma chamber to grow a thin oxide layer (Ni—P—O) 18 on the surface of the Ni—P layer 13. The corresponding layered structure is shown in FIG. 2. Layer 12, 13 and 18 depicted in FIG. 2 represent the Al—Mg substrate, Ni—P layer and the thin oxide layer, respectively.

(c) Forming a non-wetting mask on the Ni—P—0 layer: o Subsequently, indium 19 was deposited onto the thin oxide layer 18 by the use of a sputtering apparatus. During the deposition of thin indium film, the substrate is maintained at a temperature near or slightly higher than the melting point of indium so that the deposited indium metal exists in liquid state on the oxide surface 18, which is not wetted by the hemi-spherical liquid indium metal, and the as-deposited liquid indium formed discrete liquid islands, depicted as layer 19 in FIG. 2. Without the thin oxide layer as described above, the surface of the Ni—P layer would be wetted by the liquid indium and a continuous layer of liquid indium would be formed after the deposition of the indium thin film. Oxidation of said Ni—P layer can be accomplished by furnace oxidation, or DC or RF plasma oxidation in a vacuum chamber.

In the method disclosed in the present invention, the population density and size of the hemi-spherical indium islands can be easily controlled. During the sputtering of the masking composition on the substrate surface, the population density of the hemispherical islands per unit area will first increase then decrease with increasing average indium film thickness, and the size (i.e., diameter and height) of each hemi-spherical island increases with increasing average indium film thickness. The height of the hemispherical islands was found to be about three to four times the average thickness of the deposited indium layer.

(d) Applying sputter etching or reactive ion etching step:

Following the deposition of the discrete indium layer, the substrate was either cooled down to a temperature lower than the melting point of indium for solidification, or immediately transferred into a sputtering chamber to perform sputtering etching or reactive ion etching. The etching step was not considered done until the deposited indium layer 19 in either liquid or solid state has been completely removed from substrate surface. By choosing a low etching selectivity between the masking materials and the Ni—P—O/Ni—P layer, the discrete hemi-spherical feature of the indium layer will be closely reproduced on the surface of Ni—P layer after etching. Etching selectivity is defined as the etching rate of the layer onto which the masking composition is applied relative to that of the masking composition. It is preferred that the etching selectivity be close to or less than one. As mentioned above, the dimension and population density of the hemispherical islands of the indium layer are related to the average thickness of the indium layer. Therefore, the texture morphology on the etched Ni—P surface can be well controlled by adjusting the average thickness of indium layer and other etching parameters, such as the gas composition, pressure, power etc., each of which can affect the etching selectivity.

(e) Final steps:

After sputter etching or reactive ion etching as described above, the substrate was transferred into a sputtering apparatus to deposit the underlayer of chromium 14. After the deposition of the underlayer 14, a magnetic layer 15 was deposited on the surface of the underlayer 14. A protection layer 16 of carbon based thin film was then deposited on the magnetic layer 15 for protection and tribological needs. All these steps can be performed in the same sputtering machine. Finally, on the protection layer 16, a lubricant layer 17 was formed which may be composed of perfluoro polyether.

After the above described steps, aspirates are removed from the principal surface of the recording medium using a tape or head burnisher. This completed the preparation of the controllably textured magnetic disk, as shown in FIG. 1, according to the first preferred embodiment of the present invention.

Figure 3:
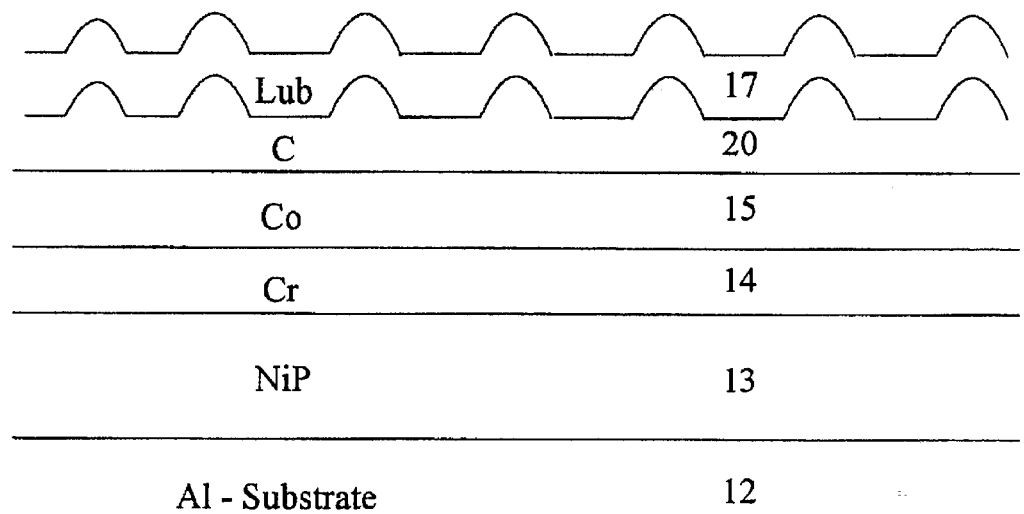
FIG. 3 shows an enlarged partial sectional view of a magnetic recording medium according to the second preferred embodiment of the present invention.

Second Preferred Embodiment: FIG. 3 represents a cross-sectional view of a magnetic recording medium manufactured according to the second preferred embodiment of the present invention. The substrate member 11 comprises the aluminum-magnesium substrate (Al—Mg) 12, and a plated nickel-phosphorous (Ni—P) layer 13, both of which are the same as those described in the first preferred embodiment. The substrate member 11 was specially polished to have surface roughness (Ra) about 20 angstroms. An underlayer of chromium 14 was deposited on the polished surface of substrate member 11. The underlayer of chromium 14 can be deposited either on a polished non-textured surface of the substrate member 11, or on a textured surface to form a plurality of concentric valleys. The latter enhances the orientation ratio resulting in better magnetic characteristics. The magnetic o layer 15, was deposited on top of the underlayer 14. On the magnetic layer 15, a protection layer 20 comprising a carbon-based thin film was deposited to a thickness of about 300 to 500 angstroms. The as-deposited protection film was then textured by means of sputter etching or reactive ion etching to form a texture surface depicted as layer 20 in FIG. 3. Subsequently, a lubricant layer 17 having a proper thickness to match the peak to valley roughness was applied.

Figure 4:
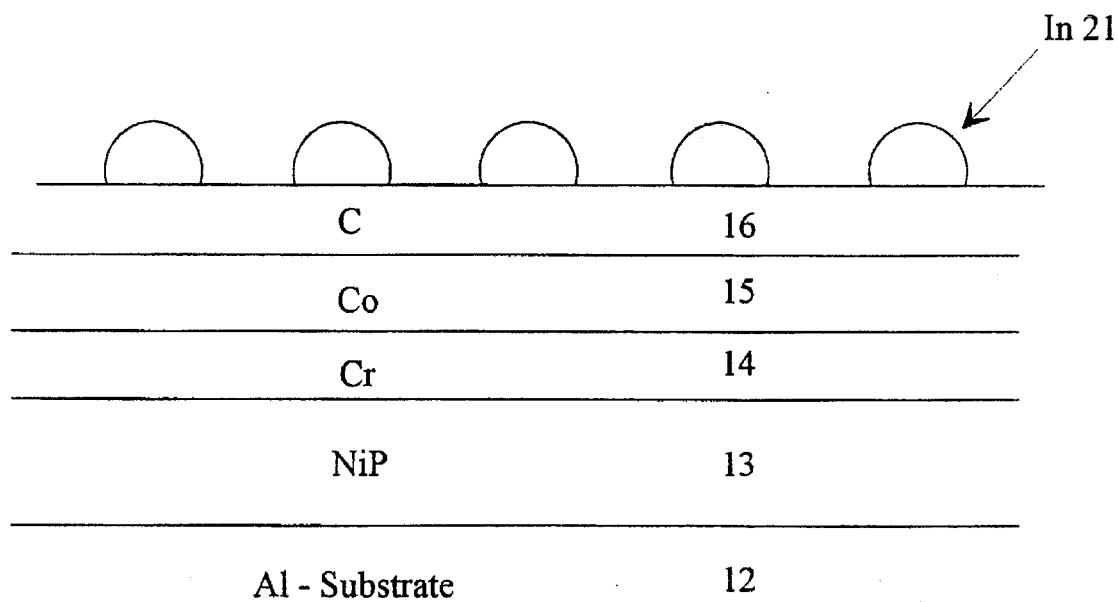
FIG. 4 is a cross-sectional representation of discrete hemi-spherical islands of indium or other low melting point materials deposited on the surface of a heated substrate with a carbon overcoat in accordance with the second preferred embodiment of the present invention.

The second preferred embodiment of the present invention comprises the following steps:

(a) Forming a non-wetting sputtering mask on an protective overcoat layer:

In order to prepare the textured surface on the magnetic recording medium in accordance with the second preferred embodiment of the present invention, a masking composition such as an indium film was sputtered onto the surface of the protective layer as a mask for sputter etching or reactive etching. During or after the deposition of the indium film, the substrate was held at a temperature near or in excess of the melting point of indium metal. Due to the poor wetting between the protective carbon layer and the liquid indium or other non-wetting masking composition, the deposited indium metal 21, as shown in FIG. 4, formed discretely dispersed hemi-spherical islands on the surface of the protective carbon layer 20, in a manner similar to the deposition of the liquid indium on oxidized Ni—P as described in the first preferred embodiment of this invention. The distribution of the hemi-spherical islands was observed to be rather uniform over the entire area of the surface, and the dimension and quantity of the hemi-spherical islands were closely related to the average thickness of the indium layer. The population density of the hemi-spherical islands per unit surface area first increased and then decreased with increasing average indium thickness, and the size of the spherical structures increased with the thickness of the indium film.

(b) Performing sputter etching or reactive ion etching:

After the deposition of the indium layer, the disk was either cooled down to a temperature below the melting point of indium for solidification, or immediately transferred into a sputter etching or reactive ion etching apparatus to performing the etching step therein. During the etching step, it is preferable that both indium and carbon having comparable etching rates. To achieve that, reactive ion etching is preferred. By proper choice of the types of gases and the proportions thereof, for example, using an argon and oxygen mixture, an etching selectivity of close to one can be achieved between indium and carbon. Finally, the topology of the hemi-spherical structure of discrete indium islands was reproduced on the carbon surface after etching. For tribology consideration, it is preferable that the protective carbon layer after the texture pattern is formed is continuous. Therefore, it is preferred that the protective carbon layer, or the carbon overcoat, has at least a slightly greater thickness than what is normally necessary, to allow a possible overetching.

(c) Applying a lubricant layer:

Subsequently, a lubricant layer 17 containing a suitable lubricant such as perfluoro polyether and having a proper thickness was formed on the textured carbon layer 20. Thereafter, projections and aspirates were removed from the medium surface by a tape or head burnisher. This completed the preparation of the controllably textured magnetic disk, as shown in FIG. 3, according to the second preferred embodiment of the present invention.

Figure 5:
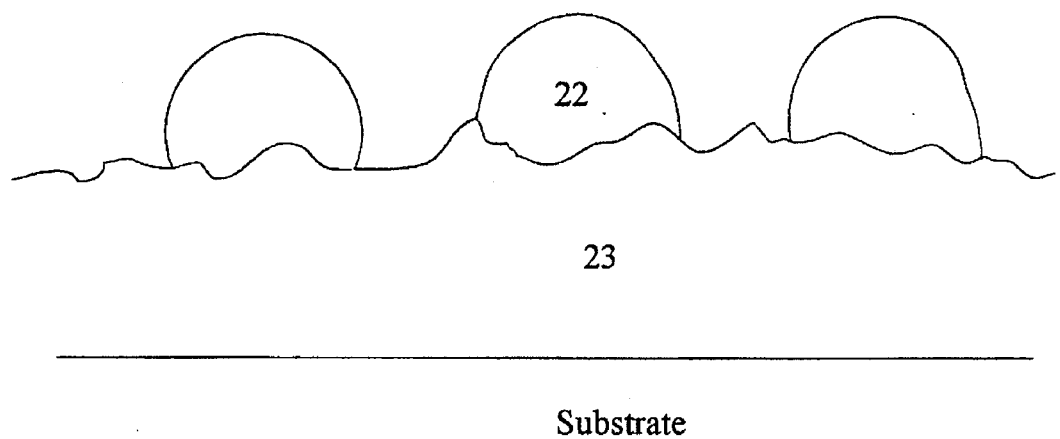
FIG. 5 is an enlarged cross-sectional representation of liquid metal agglomerates on a rough surface, used as a mask for substrate etching.
Figure 6:
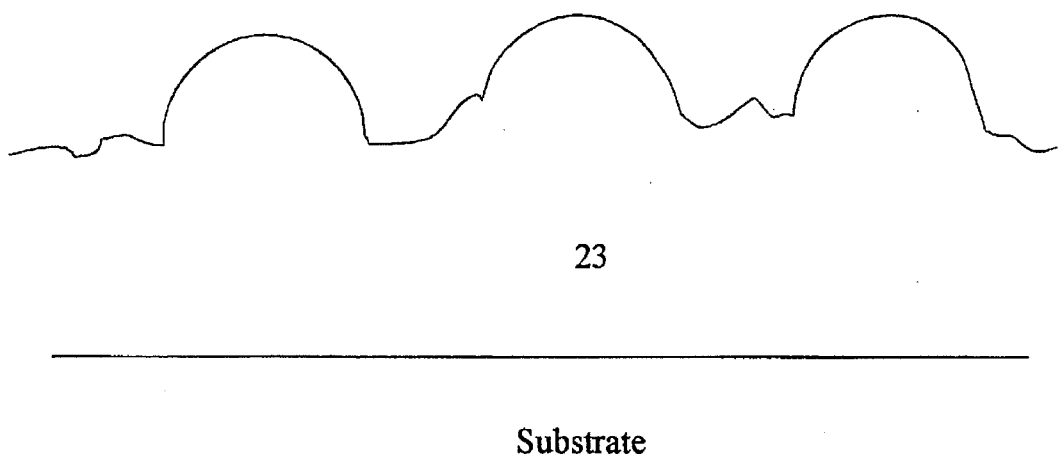
FIG. 6 is a cross-sectional representation of FIG. 5 after etching; the masking material is etched away and the smoothness of the texture pattern is achieved independent of the roughness of the substrate.

In the above-mentioned embodiments, the various steps in preparing the magnetic recording medium, including the formations of underlayer, magnetic layer, protective layer, and the masking layer using a low melting point metal or alloy such as an indium layer, as well as the creation of surface texture by the use of sputter etching or reactive ion etching, can be successively performed in the same vacuum apparatus. The surface morphology of the magnetic recording medium can be precisely controlled by adjusting the average thickness of the non-wetting masking layer, and/or the ambient gas composition in the etching chamber where sputter etching or reactive ion etching is performed. One of the advantages of the recording disks obtained from the method disclosed in the present invention is that, the textured surface always has a uniform and smooth surface on the top thereof, independent of the roughness of the substrate or overcoat. This is illustrated in FIG. 5 and FIG. 6. In FIG. 5 masking material of Indium 22 was deposited on a surface layer 23, which can be either a NiP layer in case of first preferred embodiment, or a carbon layer in case of second preferred embodiment. The agglomeration of the non-wetting liquid metal always forms smooth surface due to its high surface energy (i.e., the high surface tension between the liquid metal and the ambient gas). After the etching step as shown in FIG. 6, the masking material is completely removed. The smooth surface having the hemi-spherical feature is transferred to surface layer 23, which can be either the NiP layer or the carbon layer. Such a smooth surface is independent of the roughness of the underlaying surface. The method disclosed in the present invention can, therefore, greatly reduce the defects and provide well controlled topography as compared with conventional mechanical texturing methods. The peak to valley of the hemispherical structure can be controlled to be about 50Å.

Figure 7:
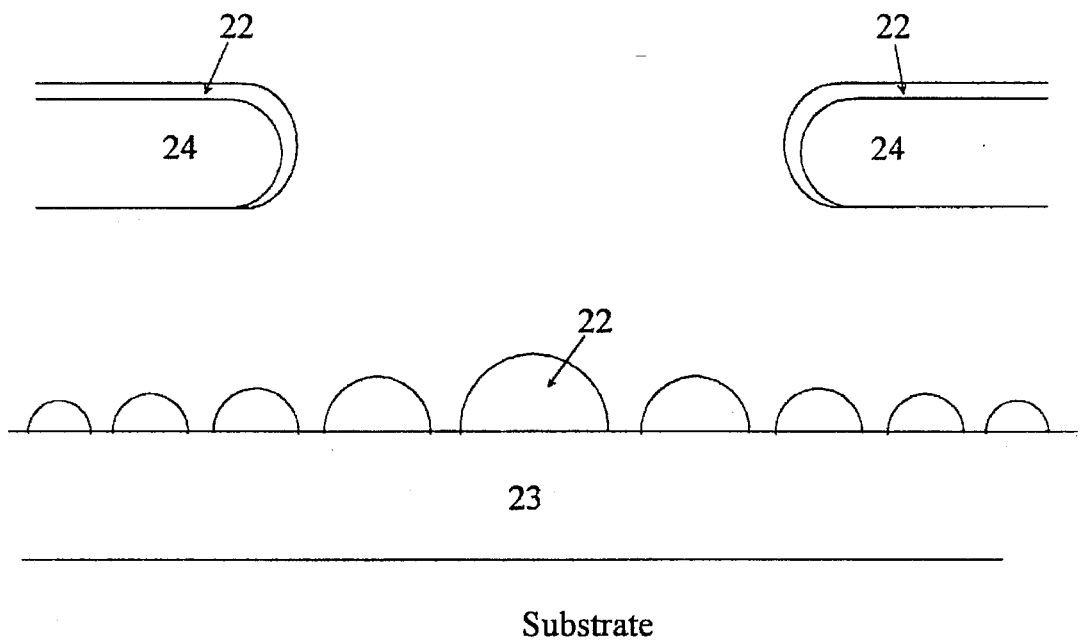
FIG. 7 is a cross-sectional representation of a shadowing mask placed on top of a magnetic disk during the deposition of the low melting point masking material; only a portion of the disk is receiving the masking material.
Figure 8:
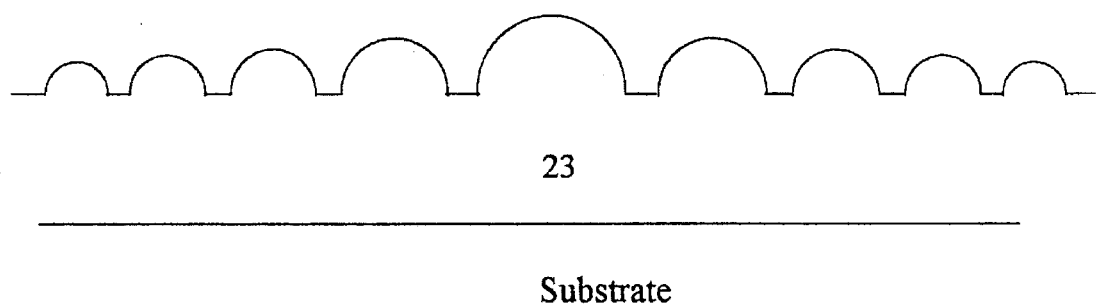
FIG. 8 is a cross-sectional representation of a "band texture" structure resulted from FIG. 7, after the masking material is removed by sputter or reactive ion etching.

The above approaches can be applied to a portion or portions of a disk, for example, the inner portion of a disk on which the magnetic head lands, to form a "band texture". Referring now to FIG. 7, prior to the deposition of the low melting point masking composition onto a substrate having a top layer 23, a shadowing mask 24 can be placed to cover the entire disk except a small circular band area which is exposed to receive the masking material 22. After sputter or reactive ion etching, a narrow "band texture" structure will be formed as shown in FIG. 8. As a result of the shadowing effect, the transition from textured area to non-textured area will be very smooth. Since the non-textured area will receive a blank etching, the texture pattern will project above the base line.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing a magnetic recording medium with a controlled texture pattern thereon using a masking composition and a sputter etching or reactive etching technique, said method comprises the steps of:
    (a) obtaining a precursory medium which comprises a substrate;
    (b) treating a surface of said precursor, medium so that it becomes a non-wetting surface relative to said masking composition;
    (c) depositing a liquid mask on said surface according to the steps of:
        (i) depositing a masking composition on said surface;
        (ii) heating said masking composition so as to cause said masking composition to liquify and become a liquid masking wherein said non-wetting surface causes said liquid mask to exist as a non-connecting phase;
    (d) cooling said liquid mask to solidify and form a plurality of non-connecting protrusions wherein said non-connecting protrusions constitute a texturing mask which exhibits a predetermined surface topology; and
    (e) performing sputter etching or reactive ion etching on said precursory medium and said texturing mask until said texturing mask is removed therefrom and said topology of said texturing mask is transferred to said precursory medium.

2. The method of preparing a magnetic recording medium of claim 1 wherein said surface,is an oxidized Ni—P layer which has been treated to become non-wetting relative to said masking composition by subjecting a Ni—P layer, which has been deposited on said substrate, to an oxidizing environment to become said oxidized Ni—player.

3. The method of preparing a magnetic recording medium of claim 2 wherein said oxidation of said Ni—P layer is accomplished by furnace oxidation or by DC and RF plasma oxidation in a vacuum chamber.

4. The method of preparing a magnetic recording medium of claim 2 which further comprises the steps of:
    (a) depositing an underlayer of chromium on said surface;
    (b) depositing a magnetic layer on said chromium underlayer;
    (c) depositing a protective overcoat on said magnetic layer, said overcoat being selected from the group consisting of carbon, oxides and nitrides; and
    (d) performing lubrication and burnishing on said protective layer.

5. The method of preparing a magnetic recording medium of claim 4 wherein said steps of depositing said masking composition, underlayer, magnetic layer and overcoat layer are all done using an integrated sputter deposition process in a single vacuum system without having to expose said substrate to air.

6. The method of preparing a magnetic recording medium of claim 1 wherein said surface has been treated by depositing thereon a thin layer of carbon.

7. The method of preparing a magnetic recording medium of claim 1 wherein said non-wetting surface contains a layer of glass, ceramic, or glass/ceramic material.

8. The method of preparing a magnetic recording medium of claim 1 wherein said masking composition comprises a low melting metal or alloy selected from the group consisting of In, Ga, Sn, Bi, Pb, and their alloys.

9. The method of preparing a magnetic recording medium of claim 1 wherein said substrate is made from a material selected from the group consisting of: Ni—P deposited on aluminum, glass, ceramics, and mixtures of glass and ceramic.

10. The method of preparing a magnetic recording medium of claim 1 wherein said sputter etching or reactive ion etching has an etching selectivity equaling or less than one but greater than zero.

11. The method of preparing a magnetic recording medium of claim 1 wherein said masking composition comprises indium and said sputter etching or reactive ion etching is performed in an ambient containing a mixture of Ar and $O_2$.

12. The method of preparing a magnetic recording medium of claim 1 wherein said precursory medium further comprises a Ni—P layer, a chromium underlayer, a magnetic layer, and an overcoat layer, arranged in the order away from said substrate, and said masking composition is deposited on said overcoat layer.

13. The method of preparing a magnetic recording medium of claim 1 wherein said precursory medium is heated in step (c) to a temperature close to or slightly above a melting temperature of said masking composition to obtain said texturing mask which comprises a plurality of discrete hemi-spherical islands.

14. The method of preparing a magnetic recording medium of claim 2 wherein said protective overcoat comprises zirconium oxide.

15. A method for preparing a magnetic recording medium with a controlled texture pattern involving forming a liquid phase mask in combination with a sputter etching or reactive etching technique, said method comprises the steps of:

(a) obtaining a precursory medium which comprises a substrate;

(b) treating a surface &said precursory medium so that it becomes a non-wetting surface relative to said liquid phase masking composition;

(c) depositing a masking composition on said surface;

(d) heating said masking composition so as to cause it to become a liquid phase mask wherein said non-wetting surface causes said liquid phase mask to exist as a non-connecting phase;

(e) cooling said liquid phase mask to solidify and form a plurality of non-connecting protrusions wherein said non-connecting protrusions constitute a texturing mask exhibiting a predetermined surface topology; and (f) performing sputter etching or reactive ion etching on said precursory medium and said texturing mask until said texturing mask is removed and said topology of said texturing mask is transferred to said precursory medium.

* * * * *